US011370301B2

(12) United States Patent
Skelly et al.

(10) Patent No.: US 11,370,301 B2
(45) Date of Patent: Jun. 28, 2022

(54) MOTION AND ACCELERATION SENSORY SPEEDOMETER FOR A TRANSPORTATION VEHICLE

(71) Applicants: VOLKSWAGEN AKTIENGESELLSCHAFT, Wolfsburg (DE); AUDI AG, Ingolstadt (DE); PORSCHE AG, Stuttgart (DE)

(72) Inventors: Loren Skelly, San Francisco, CA (US); Heiko Maiwand, Foster City, CA (US); Ryan Williams, Menlo Park, CA (US); Payton White, Foster City, CA (US); Alisia Martinez, San Francisco, CA (US); Kevin Lieberman, San Mateo, CA (US); Jongin Seok, San Jose, CA (US); Doug Hauger, San Francisco, CA (US); Bouaziz Tahar, Ingolstadt (DE)

(73) Assignee: Volkswagen Aktiengesellschaft

( * ) Notice: Subject to any disclaimer, the term of this patent is extended or adjusted under 35 U.S.C. 154(b) by 286 days.

(21) Appl. No.: 16/433,528

(22) Filed: Jun. 6, 2019

(65) Prior Publication Data

US 2020/0384857 A1 Dec. 10, 2020

(51) Int. Cl.
*B60K 35/00* (2006.01)
*B60K 37/02* (2006.01)
*G01P 7/00* (2006.01)

(52) U.S. Cl.
CPC .............. *B60K 35/00* (2013.01); *B60K 37/02* (2013.01); *G01P 7/00* (2013.01)

(58) Field of Classification Search
CPC .. B60K 35/00; B60K 37/02; B60K 2370/155; B60K 2370/167; G01P 7/00; G01P 1/08
See application file for complete search history.

(56) References Cited

U.S. PATENT DOCUMENTS

| 1,523,123 | A | * | 1/1925 | Jacoby | G07C 5/0841 368/8 |
| 1,532,548 | A | * | 4/1925 | Ramsey | G01P 1/08 116/57 |
| 2,907,297 | A | * | 10/1959 | Zargarpur | G01P 1/08 116/62.3 |
| 4,262,537 | A | * | 4/1981 | Jander | A63C 5/06 73/490 |
| 6,625,562 | B2 | * | 9/2003 | Hayashi | G01P 1/08 702/142 |
| 6,675,650 | B1 | * | 1/2004 | Paulo | B60K 35/00 73/491 |
| 6,844,811 | B2 | * | 1/2005 | Hayashi | B60R 16/0232 340/425.5 |

(Continued)

FOREIGN PATENT DOCUMENTS

| DE | 4307367 A1 * | 9/1994 | ............. G09F 9/00 |
| DE | 102008058664 A1 * | 5/2010 | ............. B60K 35/00 |

(Continued)

OTHER PUBLICATIONS

Car Talk, Jul. 9, 2014, 18 pages (Year: 2014).*

(Continued)

*Primary Examiner* — Yongjia Pan
(74) *Attorney, Agent, or Firm* — Barnes & Thornburg, LLP (57) ABSTRACT

Disclosed embodiments provide a technical improvement for providing visualization of vehicle speed via a speedometer in an instrument cluster of a vehicle/driver interface of a transportation vehicle by providing multiple indicia of vehicle speed and rate of change of speed in a manner that connotes vehicle motion so as to enhance the driving experience for the driver and improve safety.

19 Claims, 11 Drawing Sheets

(56) References Cited

U.S. PATENT DOCUMENTS

| | | | | |
|---|---|---|---|---|
| 7,380,215 B2* | 5/2008 | Nystrom | ............... | B60K 35/00 |
| | | | | 715/772 |
| 7,589,643 B2* | 9/2009 | Dagci | ................... | G01P 1/103 |
| | | | | 340/905 |
| 7,726,255 B2* | 6/2010 | Nakamichi | ............. | G01D 7/02 |
| | | | | 116/62.4 |
| 8,055,419 B2* | 11/2011 | Meng | ....................... | G01P 1/08 |
| | | | | 701/64 |
| 8,483,907 B2* | 7/2013 | Tarte | .................... | B60K 35/00 |
| | | | | 701/36 |
| 9,588,735 B1* | 3/2017 | Briggs | .................. | G07C 5/008 |
| 2003/0164757 A1* | 9/2003 | Hayashi | ............... | B60K 35/00 |
| | | | | 340/441 |
| 2015/0177956 A1* | 6/2015 | Han | ...................... | G06F 3/048 |
| | | | | 715/771 |

FOREIGN PATENT DOCUMENTS

| | | | |
|---|---|---|---|
| DE | 102008058664 A1 | | 5/2010 |
| EP | 3631686 A1 | * | 4/2020 |

OTHER PUBLICATIONS

How a speedo works, Mar. 30, 2015, 2 pages (Year: 2015).*
Oldsmobile Toronado 1966-1967, Aug. 11, 2014, 4 pages (Year: 2014).*

* cited by examiner

FIG. 11

MOTION AND ACCELERATION SENSORY SPEEDOMETER FOR A TRANSPORTATION VEHICLE

FIELD

The present disclosure relates to method operations and equipment for use in presenting speed data to a user/driver of a transportation vehicle.

SUMMARY

According to the present disclosure, systems, components, and methodologies are provided to present speed data to a user/driver of a transportation vehicle on a speedometer of the transportation vehicle.

In accordance with disclosed embodiments, the speedometer is configured to provide a plurality of indicia of the vehicle speed in a manner that connotes both speed of the vehicle and acceleration of the vehicle via displayed graphics and data.

In accordance with at least some disclosed embodiments, the speedometer includes an outer wheel (or dial) and an inner wheel (or dial).

In accordance with at least some disclosed embodiments, the outer wheel rotates in a first direction, e.g., forward, as the vehicle speed increases and the outer wheel includes markers around the circumference of the wheel in ascending order to indicate speed in miles per hour or kilometers per hour. In accordance with at least one disclosed embodiment, the wheel rotates so that the current vehicle speed aligns on a horizontal rule of the wheel. In accordance with at least one disclosed embodiment, the numerical value of the speed is also displayed in large text in the center of the wheel.

In accordance with at least some disclosed embodiments, the inner wheel rotates, in the first direction, e.g., forward, as the vehicle speed increases, but the perspective of display is from inside, wherein inner wheel includes markers around the circumference in ascending order to indicate speed in miles per hour or kilometers per hour. In accordance with at least one disclosed embodiment, the inner wheel rotate so that the current speed aligns on the horizontal rule of the wheel. In accordance with at least one disclosed embodiment, the numerical value of the speed is also displayed in large text in the center of the wheel.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

It should be understood that a speedometer or a speed meter is a gauge that measures and displays the movement speed of a transportation vehicle. For the purposes of this disclosure, the term "speedometer" refers to the gauge that indicates the speed of the transportation vehicle rather than the transportation vehicle sensor equipment that measures that speed.

Transportation vehicles powered by conventional Internal Combustion Engines (ICEs) provide multiple indicators to the vehicle driver's senses relating to engine power, acceleration, and speed. These sense indicators include sight, sound, and vibration produced by the operation of the ICE included in the transportation vehicle. Electric vehicles lack indicators such as sound and vibration.

Disclosed embodiments provide a technical improvement for providing visualization of vehicle speed via a speedometer in an instrument cluster of a vehicle/driver interface of a transportation vehicle by providing multiple indicia of vehicle speed and rate of change of speed in a manner that connotes vehicle motion so as to enhance the driving experience for the driver and improve safety.

Disclosed embodiments provide a new way for the driver to visualize vehicle power, speed, and acceleration in the instrument cluster. Instead of traditional round gauges with a needle rotating to markers to indicate speed and engine power (measured in Rotations Per Minute (RPM), the speedometer may be replaced with a gauge that is perceived by the driver/user as a rotating cylinder. As a result of the configuration of the speedometer, accurate measurements of power, acceleration, and speed are output along with graphical visualizations that provide the driver additional cues as to vehicle performance.

Electric vehicles (including those that provide transportation using either a completely electric motor or including an electric motor and an ICE) share many characteristics with their solely ICE counterparts. However, because of the nature of electric motors, some of the sense indicators conventionally available for a driver to experience with an ICE implemented vehicle are not available, or available to a lesser degree for electric vehicles. For example, the sound of an electric vehicle does not provide the same level or type of sound when the electric motor speeds up to achieve a higher rate of speed. Similarly, the level of vibration produced by an electric motor is similarly decreased and of a different type than is produced by a conventional ICE implemented transportation vehicle. As a result, the driving experience for a driver of an electric vehicle is significantly different than driving an ICE implemented transportation vehicle.

In particular, there is a possibility that the driver may not experience a feeling of vehicle motion (i.e., speed) and/or acceleration (i.e., the rate of change of speed) in the same way as is conventionally experienced with ICE vehicles.

Disclosed embodiments are directed at enhancing a vehicle driver's experience as part of the operation of an electric vehicle to improve the safety of the vehicle driver and safe operation of the electric vehicle. In accordance with disclosed embodiments, a vehicle-driver (user) interface is provided that includes a vehicle speedometer that communicates speed and acceleration data in a novel and intuitive way so as to connote a feeling of motion and acceleration to the driver in response to the driver increasing the speed of the vehicle and increasing the rate of change of that speed (i.e., acceleration), respectively.

Disclosed embodiments, provide for a vehicle-driver (user) interface including an instrument cluster that includes the disclosed speedometer to enhance the feeling of motion and acceleration to the vehicle driver. More specifically, disclosed embodiments may rotate an image/icon to convey acceleration (e.g., two spinning wheels on either side of a digital speed indicator. Alternatively, or in addition, disclosed embodiments may bend of adjust presentation of an image/icon to correspond to, and indicate, acceleration of the vehicle.

Disclosed embodiments provide technical utility over conventional speedometers such as those disclosed in DE 102008058664 because such prior art approaches merely provide a graphical icon bar with a digital number indicating vehicle speed and no motion or alteration of graphical objects on a user interface that provides a sense of speed or acceleration corresponding to actual movement of the vehicle. Accordingly, disclosed embodiments provide a technical solution to conveying an understanding of speed and acceleration for a vehicle driver. As such, disclosed embodiments solve the technical problem of how to provide enhanced visual cues relating to vehicle power, acceleration and speed in a vehicle with limited sound and vibration indicators (e.g., non-ICE vehicles).

According to the present disclosure, systems, components, and methodologies are provided to present speed data to a user/driver of a transportation vehicle on a speedometer of the transportation vehicle. Thus, in accordance with disclosed embodiments, the speedometer is configured to provide a plurality of indicia of the vehicle speed in a manner that connotes both speed of the vehicle and acceleration of the vehicle via displayed graphics and data.

Figure 1A:
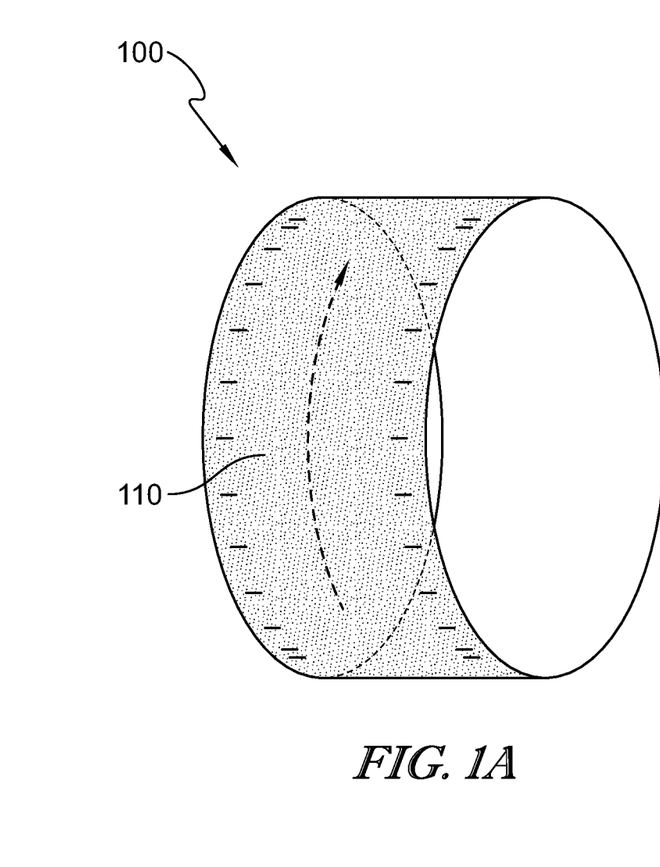
FIGS. 1A-1B illustrate an example of a disclosed embodiment of a speedometer for providing speed data regarding a transportation vehicle.
Figure 1B:
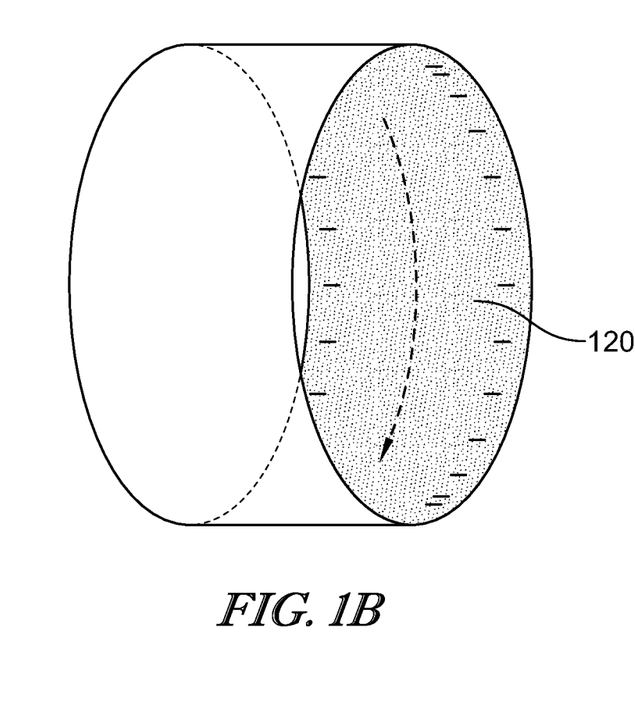
Figure 2:
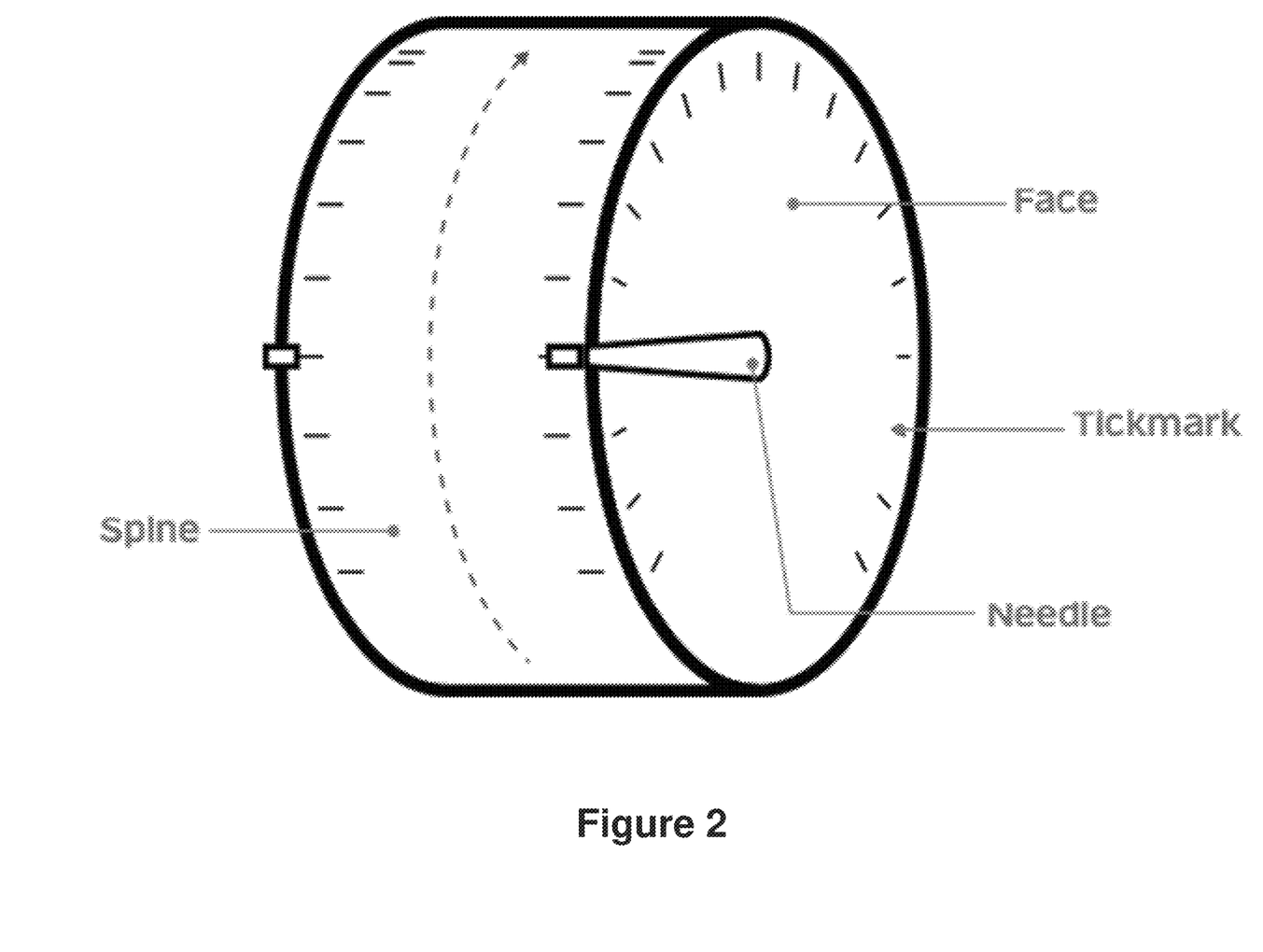
FIG. 2 illustrates an example of a wheel that rotates relative to a stationary needle in accordance with various disclosed embodiments.

As illustrated in FIGS. 1A-1B, in accordance with at least some disclosed embodiments, a speedometer 100 may include an outer wheel 110 and an inner wheel 120. The outer wheel 110 may rotate in a first direction, e.g., forward, as the vehicle speed increases and the outer wheel 110 may include tick-marks (markers indicating incremental values of speed) 115 around the circumference of the wheel 110 in ascending order to indicate speed in miles per hour or kilometers per hour. In accordance with at least one disclosed embodiment, the wheel 110 may rotate so that the current vehicle speed aligns on a horizontal rule of the wheel 110, or, as illustrated in FIG. 2, with a needle 225. In accordance with at least one disclosed embodiment, the numerical value of the speed may also be displayed in large text in the center of the wheel, as illustrated in FIGS. 6-11.

Returning to FIGS. 1A-1B, in accordance with at least some disclosed embodiments, the inner wheel 120 may also rotate, in the first direction, e.g., forward, as the vehicle speed increases, but the perspective of display may be from inside, wherein inner wheel 120 includes tick-marks (markers indicating incremental values of speed) 125 around the circumference shown on the face of the wheel in ascending order to indicate speed in miles per hour or kilometers per hour. In accordance with at least one disclosed embodiment, the inner wheel 120 may also rotate so that the current speed aligns on the horizontal rule of the wheel 120, or, like as illustrated in FIG. 2, with a needle. Further, in accordance with at least one disclosed embodiment, the numerical value of the speed may also be displayed in large text in the center of the wheel. It should be understood that disclosed embodiments may include only one of the wheels 110, 120 or both.

Figure 3:
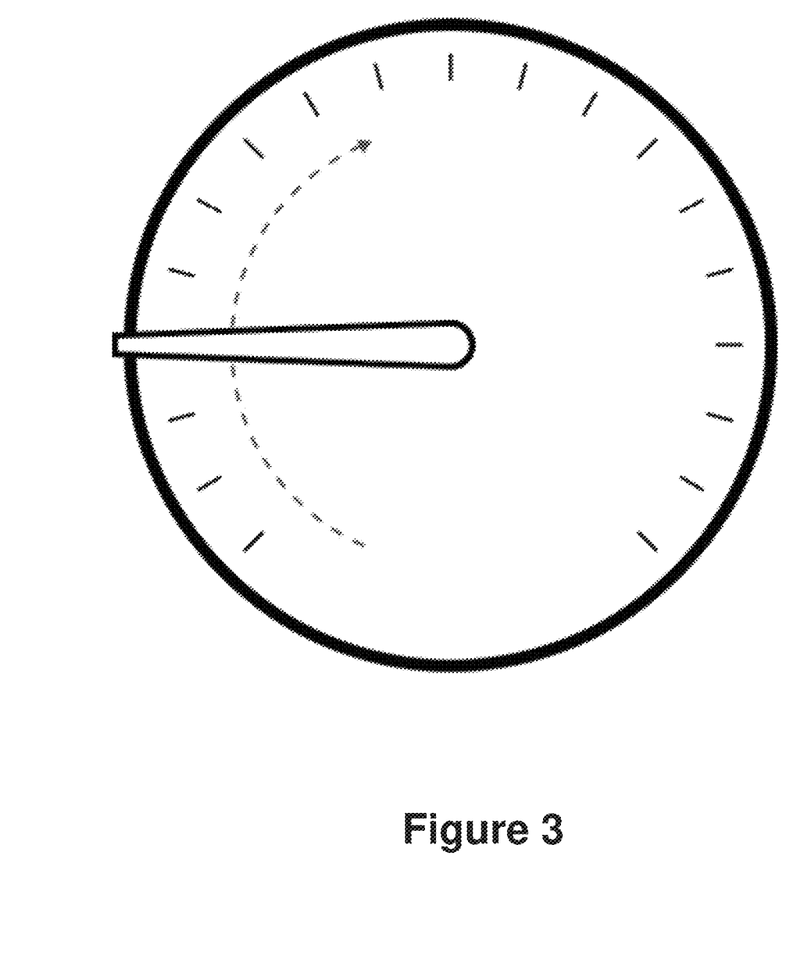
FIG. 3 further illustrates one perspective view of a wheel and needle in relationship to one another in accordance with the disclosed embodiments.

Further, as illustrated in FIG. 3, in accordance with at least one disclosed embodiment, the relative movement of a needle in relationship to a wheel is fundamentally different than convention speedometer gauges. More specifically, in accordance with at least some disclosed embodiments, the needle 140 is fixed stationary in a locked position and the wheel moves relative to the needle so as to more effectively convey speed and acceleration.

Figure 4:
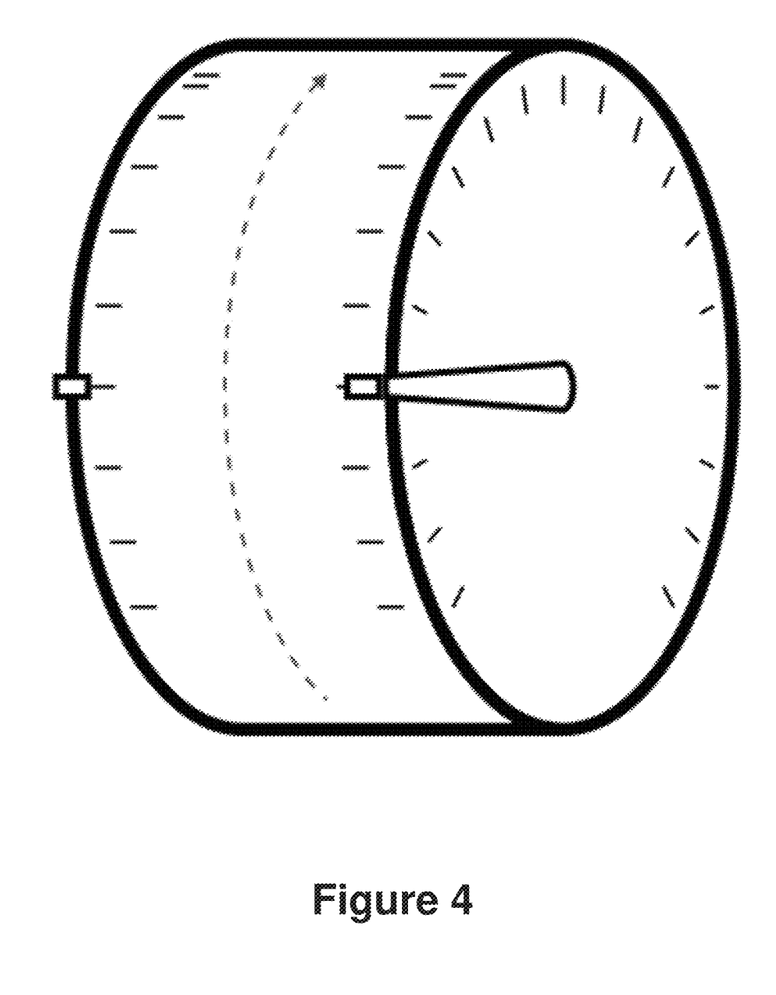
FIG. 4 further illustrates one perspective view of a wheel and needle in relationship to one another and with reference to a spine of the wheel in accordance with the disclosed embodiments.
Figure 5:
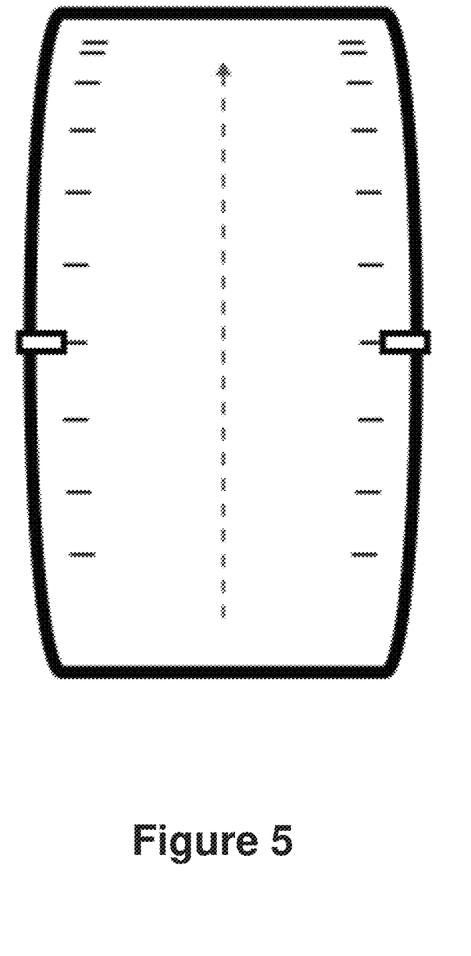
FIG. 5 illustrates a shifted perspective of a speedometer wheel in accordance with disclosed embodiments wherein only the spine may be displayed.

In accordance with at least one implementation, the tick-marks 115/125 may be positioned on a spine 150 of the wheel 110/120, as illustrated in FIG. 4. Moreover, as illustrated in FIG. 5, in one shifted perspective of the speedometer only the spine may be displayed. Accordingly, the same information is shown as in other embodiments, wherein, with the wheel rotation, the movement of the spine provides an additional sense of motion.

Figure 6:
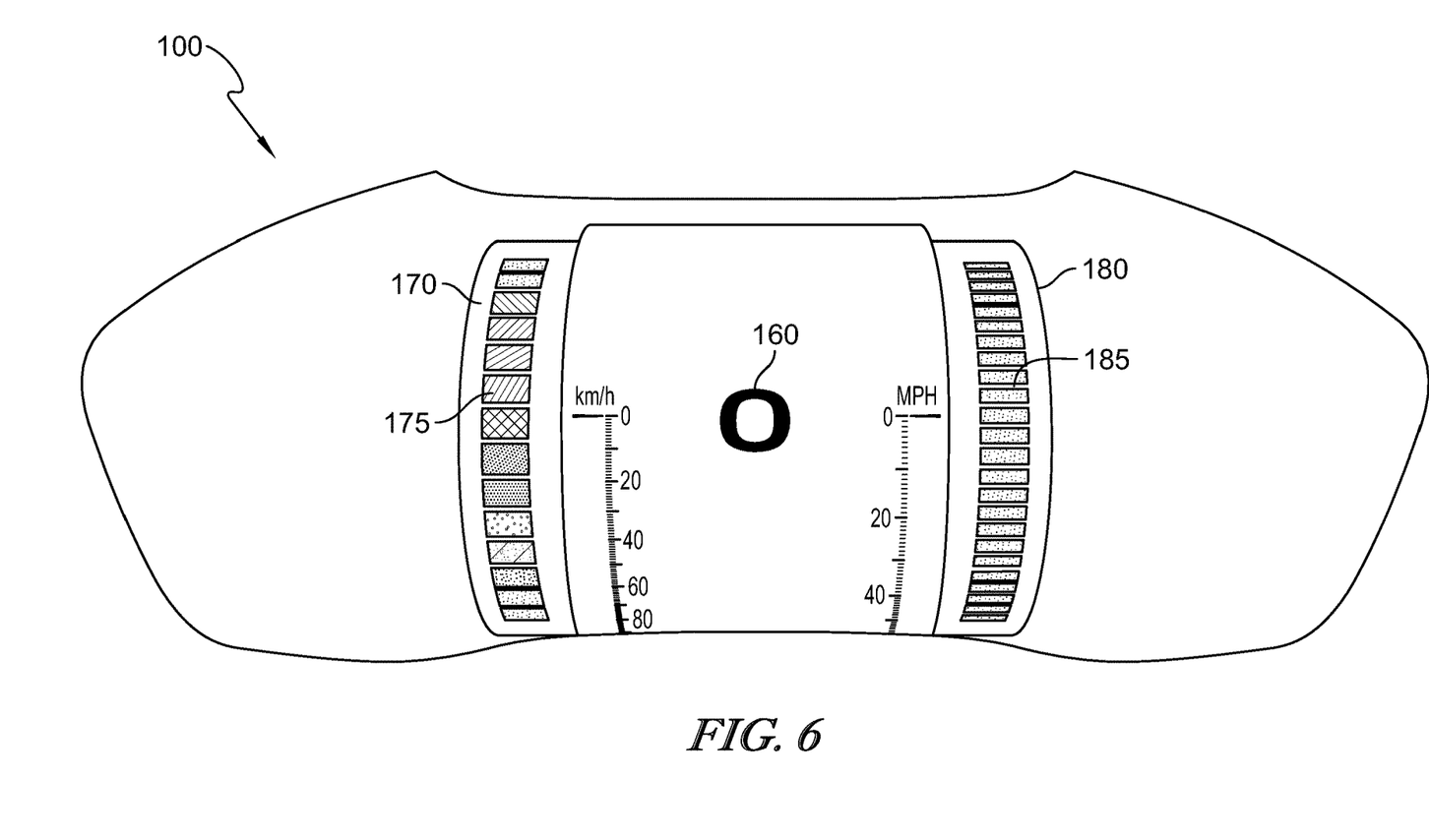
FIGS. 6-8 illustrate a graphical user interface including a speedometer in accordance with disclosed embodiments.
Figure 7:
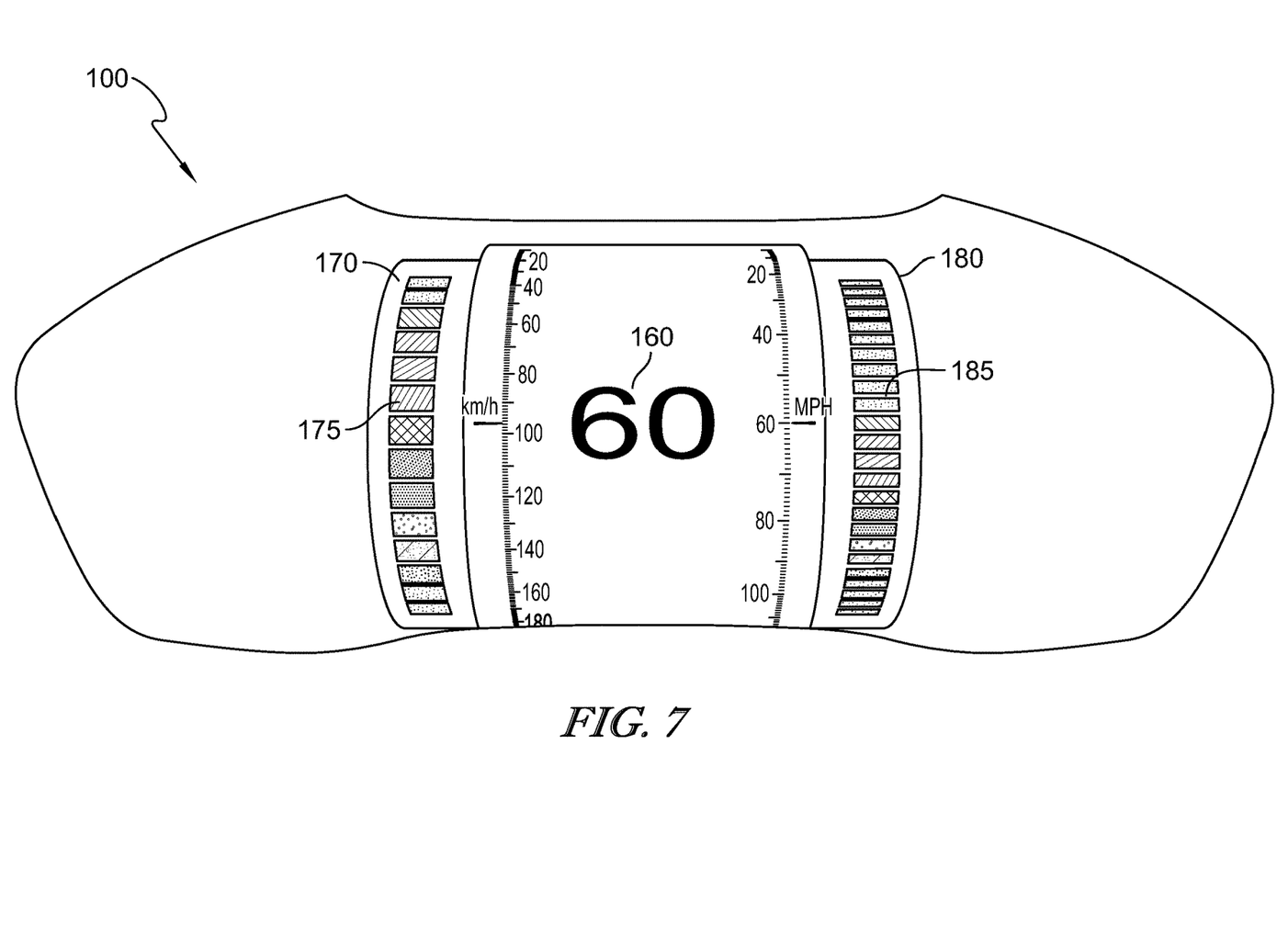
Figure 8:
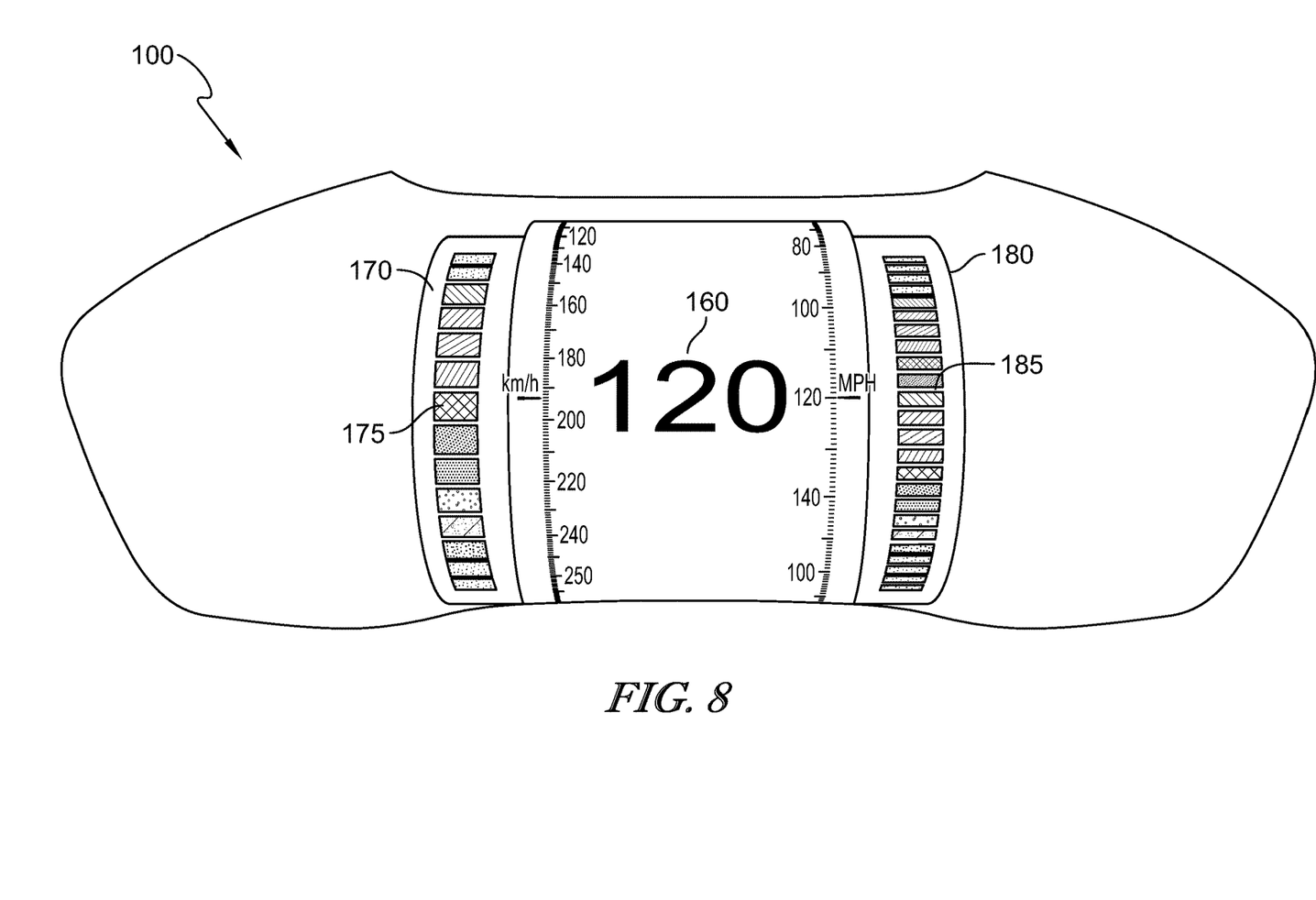

As illustrated in FIGS. 6-8, disclosed embodiments may be implemented in a vehicle display to indicate a digital numerical value 160 of vehicle speed, along with a representation of analog speed via dials (i.e., wheels) that move in a direction (e.g., downward) as vehicle speed increases. As shown in FIGS. 6-8, the vehicle speed two dials 170, 180 may be provided that correspond to speed in kilometers per hour and miles per hour. As shown in FIG. 7, volume bars 175, 185 in the dials may be filled to indicate that the accelerator has been applied by the driver. Thus, by comparing the shading in the volume bars 175, 185 shown in FIGS. 6-8, it should be clear that the shading is altered to indicate application of an accelerator (e.g., accelerator pedal) of the vehicle.

Figure 9:
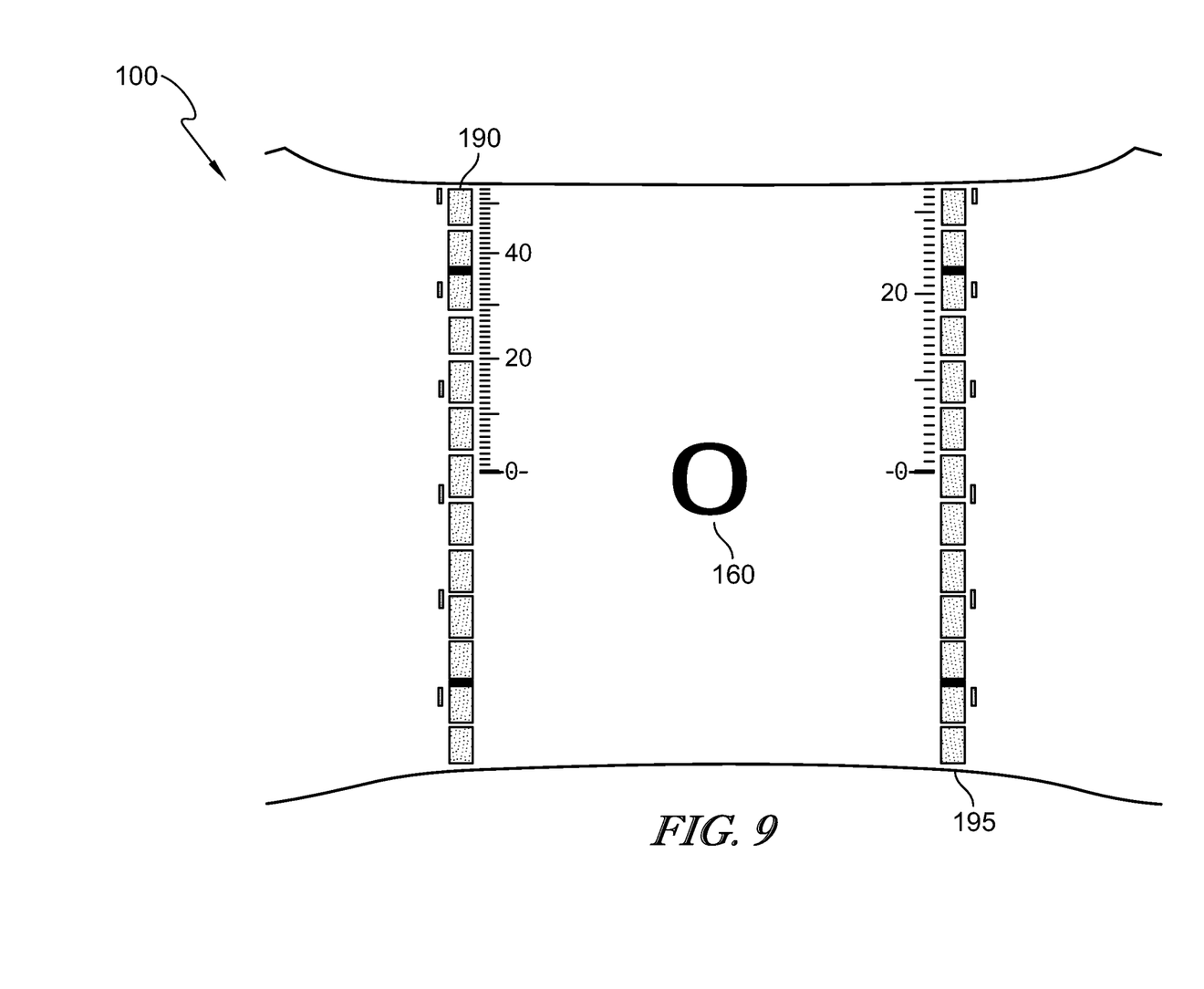
FIGS. 9-11 illustrate another graphical user interface including a speedometer in accordance with disclosed embodiments.
Figure 10:
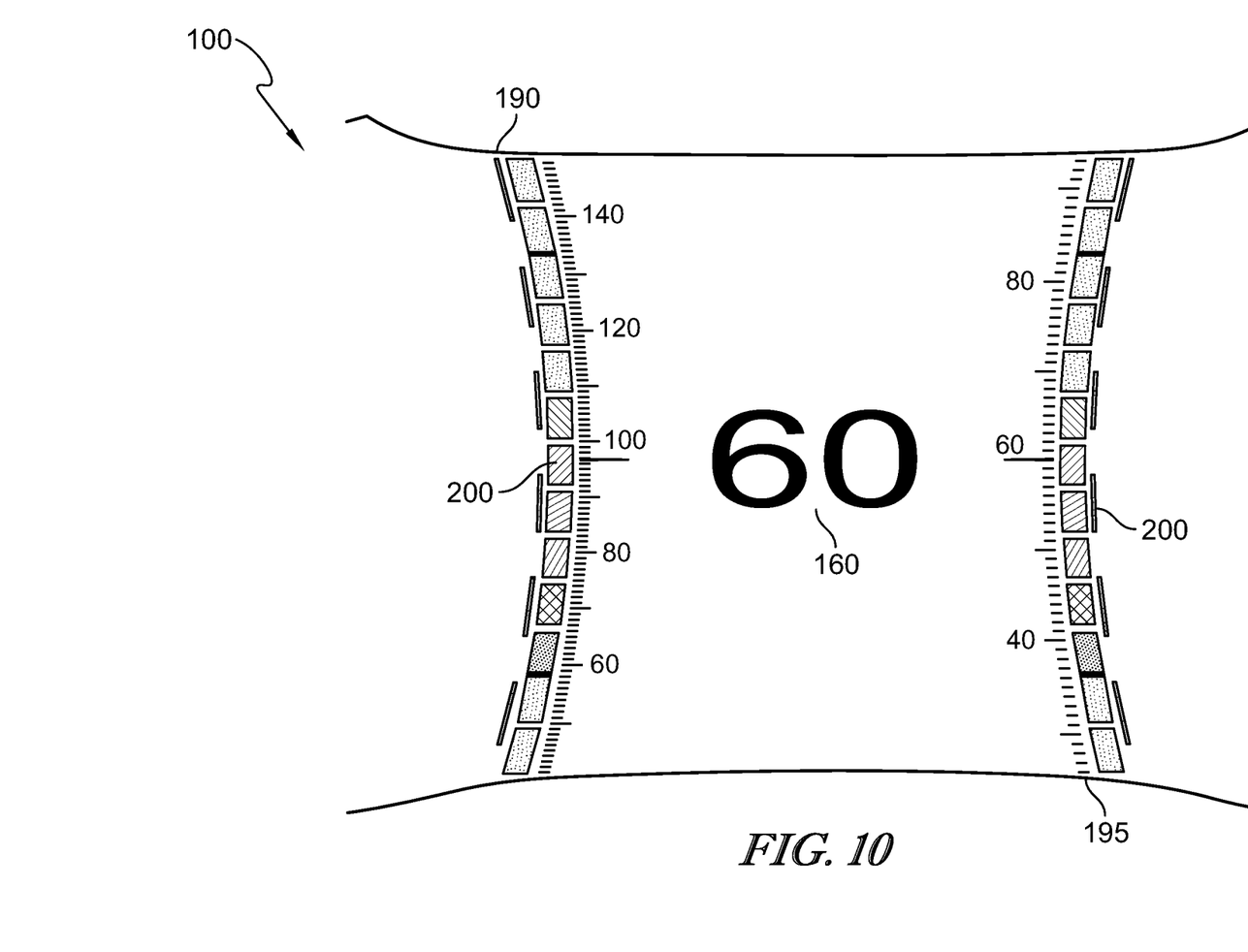
Figure 11:
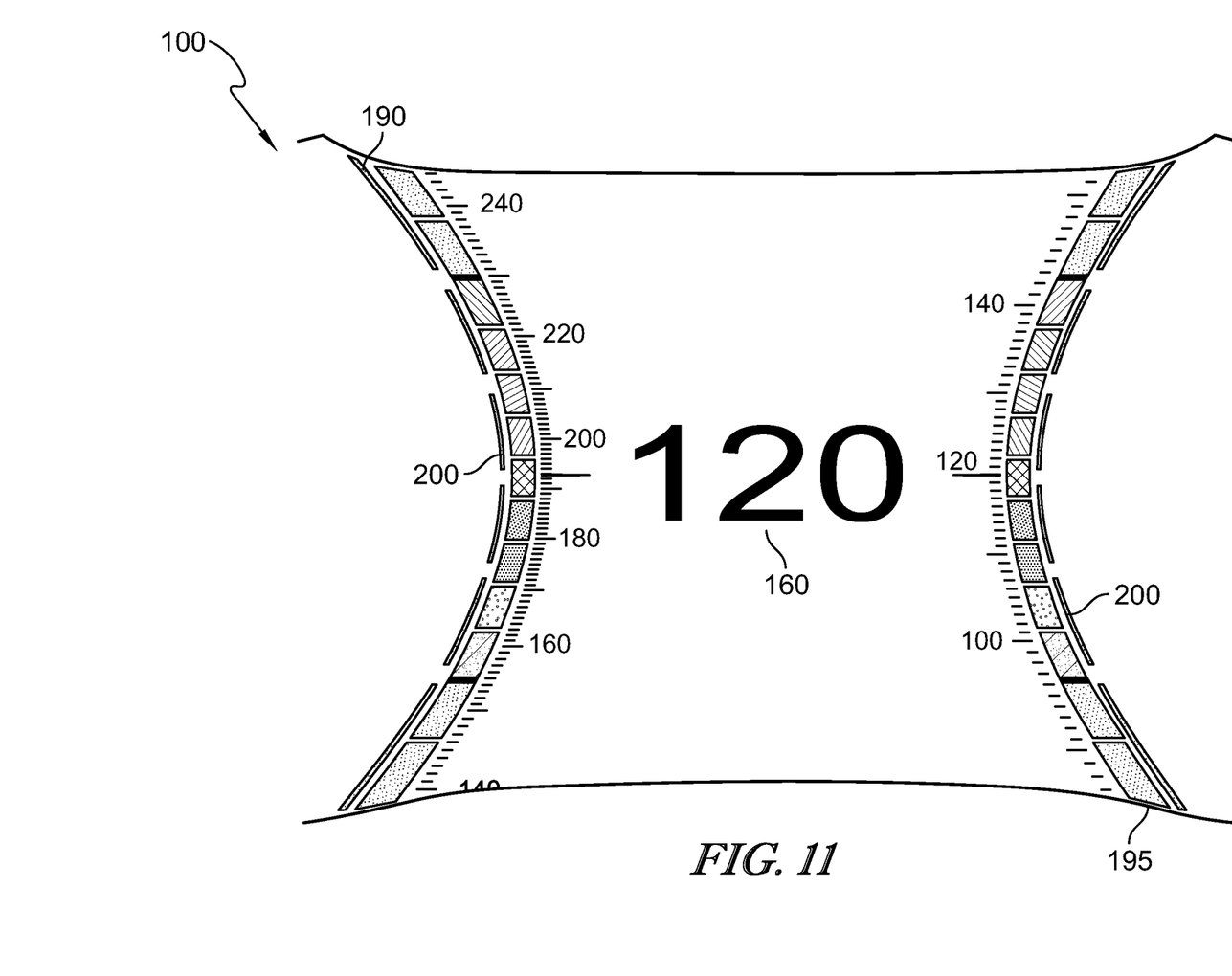

Likewise, the functionality explained above, as illustrated in FIGS. 6-8, may also be included in an embodiment illustrated in FIGS. 9-11. As shown in FIGS. 9-11, the actual shape of the dial may be altered to provide an indication of speed and/or acceleration. Thus, as shown in FIG. 9, when a vehicle is stationary, with a speed of 0, the shape of the dials 190, 195 is such that the dials are vertical, linear and parallel to one another. However, as indicated by FIGS. 10-11, the shape of the dials 190, 195 is altered so as to curve inward, for example. For example, the analog speed, power/accelerator and visual speed may all be distorted as the force per unit mass (often referred to as the "G-force") increases and decreases. It should be understood that the force per unit mass may be measured by one or more sensors included in the transportation vehicle and that may be configured as is conventionally known.

Thus, it should be understood that the degree of deformation may increase based on increased acceleration that produces the increased force per unit mass. Moreover, it should be understood that the deformation of the shape may be inward, outward or any other deformation or shape alteration that conveys a sense of movement to the driver to enhance the driver's sensory perception of vehicle speed and acceleration.

Further, as shown in FIGS. 9-11, shapes map be positioned adjacent to the dials to further convey a sense of movement, for example, wherein the shapes move down as speed increases. Thus, movement is continuous and persistent unlike conventional analog speedometer dials which only move during acceleration.

As explained above, disclosed embodiments may be implemented in conjunction with electric motor or ICE implemented transportation vehicles. Thus, the utility of the disclosed embodiments within those technical contexts has been described in detail. However, the scope of the innovative concepts disclosed herein is not limited to those technical contexts.

While the functionality of the disclosed embodiments and the system components used to provide that functionality have been discussed with reference to specific terminology that denotes the function to be provided, it should be understand that, in implementation, the component functionality may be provided, at least in part, using components present and known to be included in conventional transportation vehicles.

For example, as discussed above, disclosed embodiments provide a user interface meant to display information indicating the status and usage of a transportation vehicle, for example, vehicle speed and acceleration. Thus, it should be understood that the user interface is implemented using a graphical user interface that includes various graphics meant to convey that data in a meaningful way that conveys a sense of motion corresponding to the actual operation of the transportation vehicle. Thus, it should be understood that the user interface is implemented at least in part using software for performing functionality to enable measurement and analysis of data, at least in part, using software code stored on one or more non-transitory computer readable mediums running on one or more processors in a transportation vehicle. Such software and processors may be resident with the transportation vehicle operation systems and interact with other transportation vehicle functionality components. Such components may be coupled with the at least one controller for communication and control via a CANbus of the transportation vehicle.

It should be understood that a graphical user interface provided in accordance with the disclosed embodiments may be configured to enable output of the speedometer and acceleration graphics disclosed herein in the alternative so as to enable a user to select from among the different representations to customize their interface.

It should further be understood that the presently disclosed embodiments may be implemented using dedicated or shared hardware included in a transportation vehicle. Therefore, components of the module may be used by other components of a transportation vehicle to provide vehicle functionality without departing from the scope of the invention.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

Disclosed embodiments include the methods described herein and their equivalents, non-transitory computer readable media programmed to carry out the methods and a computer system configured to carry out the methods. Further, included is a vehicle comprising components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

Various embodiments of the invention have been described, each having a different combination of elements. The invention is not limited to the specific embodiments disclosed, and may include different combinations of the elements disclosed, omission of some elements or the replacement of elements by the equivalents of such structures.

The invention claimed is:

1. A speedometer for a transportation vehicle, the speedometer comprising:
a display that includes at least one rotating wheel that is controlled to rotate relative to a stationary portion of the display to depict rotation of the at least one rotating wheel by relative displacement of an edge of the at least one wheel relative to the stationary portion of the display; and
a processor configured to control the rotation of the at least one rotating wheel relative to a fixed point in the stationary portion of the display to indicate a speed of the transportation vehicle, wherein a rate of rotation of the wheel is based on a rate of acceleration of the speed of the transportation vehicle,
wherein the display further comprises a plurality of shapes positioned adjacent to the at least one wheel that move continuously relative to the at least one wheel to convey a sense of movement.

2. The speedometer of claim 1, wherein the at least one rotating wheel rotates relative to a fixed point so as to display indicia of a speed and acceleration of the transportation vehicle.

3. The speedometer of claim 1, wherein the at least one rotating wheel rotates so that a current vehicle speed indicia positioned on the at least one rotating wheel aligns on a horizontal rule of the at least one rotating wheel.

4. A user interface for a transportation vehicle, the user interface comprising:
a display that includes at least one wheel that is controlled to rotate relative to a stationary portion of the display to depict rotation of the at least one wheel by relative displacement of an edge of the at least one wheel,
wherein the at least one wheel appears to rotate relative to a fixed point in the stationary portion of the display to convey movement and indicate a speed of the transportation vehicle,
wherein a rate of rotation of the wheel is based on a rate of acceleration of the speed of the transportation vehicle, and
wherein the display further comprises a plurality of shapes positioned adjacent to the at least one wheel that move continuously relative to the at least one wheel to convey a sense of movement.

5. The user interface of claim 4, wherein the at least one wheel rotates relative to the fixed point so as to display indicia of a speed and acceleration of the transportation vehicle.

6. The user interface of claim 4, wherein the at least one wheel rotates in a first direction as the vehicle speed increases.

7. The user interface of claim 4, wherein the at least one rotating wheel rotates so that a current vehicle speed indicia positioned on the at least one rotating wheel aligns on a horizontal rule of the at least one rotating wheel.

8. The user interface of claim 4, wherein the user interface further comprises a numerical value of the speed of the transportation vehicle.

9. The user interface of claim 4, wherein the at least one wheel includes a plurality of markers positioned around a circumference of the at least one wheel and indicating vehicle speed.

10. The user interface of claim 1, wherein a speed of movement of the plurality of shapes increases with acceleration.

11. The user interface of claim 4, a shape of the at least one wheel is altered based on a force per unit mass produced by acceleration of the transportation vehicle.

12. The user interface of claim 11, wherein the alteration of the shape of the at least one wheel deforms the wheels proportionally based on the force per unit mass.

13. The user interface of claim 4, wherein the at least one wheel may include graphics including variable shading, wherein the shading varies based on transportation speed associated with a position of the graphics on the at least one wheel.

14. The user interface of claim 4, wherein the user interface includes at least two wheels including a first wheel and a second wheel, wherein the first wheel includes a plurality of markers positioned around a circumference of the first wheel and indicating vehicle speed in miles per hour and the second wheel includes a plurality of markers positioned around a circumference of the second wheel and indicating vehicle speed in kilometers per hour.

15. The user interface of claim 14, wherein the first and second wheels rotate together relative to respective fixed points so as to display indicia of a speed and acceleration of the transportation vehicle.

16. The user interface of claim 14, a shape of the first and second wheels is altered based on a force per unit mass produced by acceleration of the transportation vehicle.

17. The user interface of claim 16, wherein the alteration of the shape of the first and second wheels deforms the wheels proportionally based on the force per unit mass.

18. The user interface of claim 4, wherein the user interface includes at least two wheels including a first wheel and a second wheel, wherein the first wheel is an outer wheel and the second wheel is an inner wheel.

19. The user interface of claim 18, wherein the outer wheel includes markers around the circumference of the outer wheel in ascending order to indicate vehicle speed.

* * * * *